US012304036B2

(12) United States Patent
Hsieh

(10) Patent No.: US 12,304,036 B2
(45) Date of Patent: May 20, 2025

(54) SLEEVE STRUCTURE AND WORKING TOOL ASSEMBLY

(71) Applicant: KABO TOOL COMPANY, Taichung (TW)

(72) Inventor: Chih-Ching Hsieh, Taichung (TW)

(73) Assignee: KABO TOOL COMPANY, Taichung (TW)

( * ) Notice: Subject to any disclaimer, the term of this patent is extended or adjusted under 35 U.S.C. 154(b) by 297 days.

(21) Appl. No.: 18/046,494

(22) Filed: Oct. 13, 2022

(65) Prior Publication Data

US 2023/0118144 A1 Apr. 20, 2023

Related U.S. Application Data

(60) Provisional application No. 63/262,497, filed on Oct. 14, 2021.

(30) Foreign Application Priority Data

Aug. 19, 2022 (TW) .................................. 111131221

(51) Int. Cl.
*B25B 13/06* (2006.01)
*B25B 23/00* (2006.01)
*B25B 23/10* (2006.01)

(52) U.S. Cl.
CPC ............ *B25B 23/108* (2013.01); *B25B 13/06* (2013.01); *B25B 23/0035* (2013.01)

(58) Field of Classification Search
CPC ... B25B 23/10; B25B 23/108; B25B 23/0035; B25B 23/0007; B25B 13/06; B25B 13/065; B25B 13/48
See application file for complete search history.

(56) References Cited

U.S. PATENT DOCUMENTS

| | | | | |
|---|---|---|---|---|
| 6,688,195 | B1 * | 2/2004 | Hsien | B25B 13/463 81/125 |
| 9,027,444 | B2 * | 5/2015 | Chang | B25B 13/06 81/125 |
| 2005/0066778 | A1 * | 3/2005 | Chen | B25B 23/101 81/125 |
| 2014/0174264 | A1 * | 6/2014 | Wang | B25B 23/0035 81/180.1 |

(Continued)

FOREIGN PATENT DOCUMENTS

DE 10114906 A1 * 10/2002 ............ B25B 13/06

*Primary Examiner* — Robert J Scruggs
(74) *Attorney, Agent, or Firm* — CKC & Partners Co., LLC

(57) ABSTRACT

A sleeve structure includes a sleeve body, a tooth structure, a stopping structure, an elastic component and a resisting component. The sleeve body includes an opening hole. The tooth structure is disposed around an inner wall of the sleeve body, and includes a first groove and a second groove. The first groove and the second groove are disposed around the tooth structure, and the first groove is closer to the opening hole than the second groove. The stopping structure is disposed around the inner wall of the sleeve body, and the stopping structure is farther from the opening hole than the tooth structure. The stopping structure includes a through hole and an inner surrounding wall. The elastic component is disposed in the first groove and slightly protruded from the first groove. The resisting component is disposed in the second groove.

8 Claims, 7 Drawing Sheets

(56) References Cited

U.S. PATENT DOCUMENTS

| | | | | |
|---|---|---|---|---|
| 2015/0005080 | A1* | 1/2015 | Chu | B25B 13/06<br>464/157 |
| 2022/0097216 | A1* | 3/2022 | Hsieh | B25B 23/0035 |

* cited by examiner

SLEEVE STRUCTURE AND WORKING TOOL ASSEMBLY

RELATED APPLICATIONS

This application claims priority to U.S. Provisional Application Ser. No. 63/262,497, filed Oct. 14, 2021, and Taiwan Application Serial Number 111131221, filed Aug. 19, 2022, which is herein incorporated by reference.

BACKGROUND

Technical Field

The present disclosure relates to a sleeve structure. More particularly, the present disclosure relates to a sleeve structure that can grip a working tool to form a working tool assembly.

Description of Related Art

With the development of science and technology, when operating tools such as screws, the users often use a sleeve to engage the tool to increase the convenience of operation. However, when using the sleeve to engage the tool, the tool is often fallen off from the sleeve due to the excessive force exerted by the users, resulting in a waste of time.

At present, many sleeves that are convenient for the users to operate have been launched on the market, and in order to increase the stability of the sleeve engaging the tool, many accessories used with the sleeve have been developed, but the additional manufacturing costs are often increased.

Therefore, how to improve the gripping effect and the stability of the sleeve for gripping the tool, which is the goal of the relevant industry.

SUMMARY

According to one aspect of the present disclosure, a sleeve structure includes a sleeve body, a tooth structure, a stopping structure, an elastic component and a resisting component. The sleeve body has a central axis, and includes an opening hole, the opening hole is opened at one end of the sleeve body. The tooth structure is disposed around an inner wall of the sleeve body, and the tooth structure includes a first groove and a second groove. The first groove is disposed around the tooth structure. The second groove is disposed around the tooth structure, and the first groove is closer to the opening hole than the second groove. The stopping structure is disposed around the inner wall of the sleeve body, and the stopping structure is farther from the opening hole than the tooth structure. The stopping structure includes a through hole and an inner surrounding wall. The through hole corresponds to the opening hole and is passed through the inner surrounding wall. The elastic component is disposed in the first groove and slightly protruded from the first groove. The resisting component is disposed in the second groove and protruded from the second groove toward a direction of the central axis.

According to another aspect of the present disclosure, a working tool assembly includes a sleeve structure and a working tool. The sleeve structure includes a sleeve body, a tooth structure, a stopping structure, an elastic component and a resisting component. The sleeve body has a central axis, and includes an opening hole, the opening hole is opened at one end of the sleeve body. The tooth structure is disposed around an inner wall of the sleeve body, and the tooth structure includes a first groove and a second groove. The first groove is disposed around the tooth structure. The second groove is disposed around the tooth structure, and the first groove is closer to the opening hole than the second groove. The stopping structure is disposed around the inner wall of the sleeve body, and the stopping structure is farther from the opening hole than the tooth structure. The stopping structure includes a through hole and an inner surrounding wall. The through hole corresponds to the opening hole and is passed through the inner surrounding wall. The elastic component is disposed in the first groove and slightly protruded from the first groove. The resisting component is disposed in the second groove and protruded from the second groove toward a direction of the central axis. The working tool is combined with the sleeve structure, and the working tool includes an abutting portion. A shape of the abutting portion corresponds to a shape of the tooth structure. When an abutting width of the abutting portion is L1, an abutting thickness of the abutting portion is L2, the following condition is satisfied: $0.1 \leq L2/L1 \leq 0.63$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
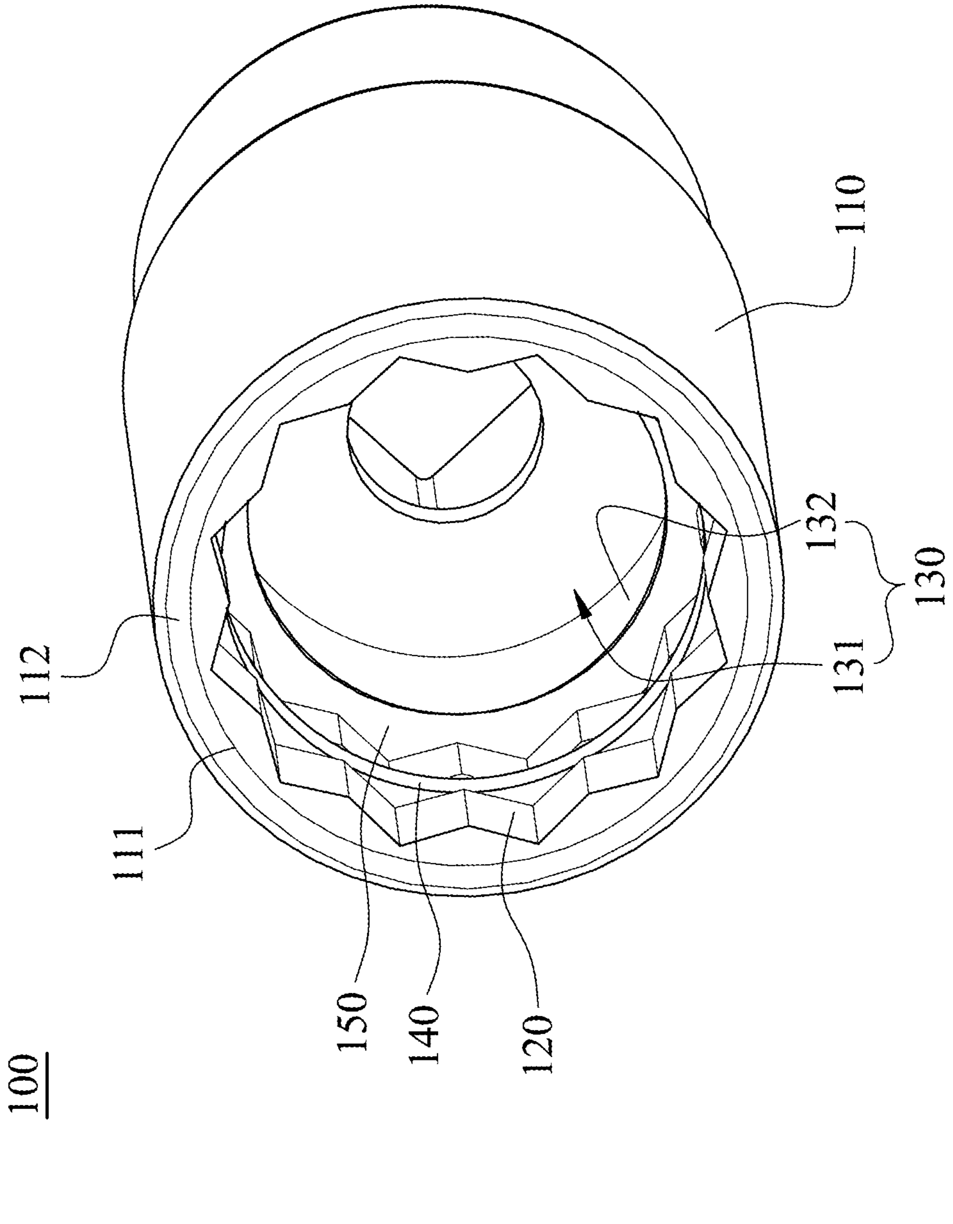
FIG. 1 is a three-dimensional schematic view of a sleeve structure according to one embodiment of the present disclosure.

The embodiments of the present disclosure will be described below by referring to the figures. For clarity, many practical details will be explained in the following description. However, the readers should realize that these practical details are not limited to the present disclosure. That is, in some embodiments of the present disclosure, the practical details are not necessary. In addition, in order to simplify the figures, some of the conventional structures and elements will be shown in the figures with simplified schematic; and the repeated elements will be shown by the same reference numerals.

Furthermore, in the present specification, when one element (or, structure and module) "is connected to", "is disposed on" or "is linked to" another element, it means the element can be directly connected to, disposed on or linked to another element or be indirectly connected to, disposed on or linked to another element (that is, there is an element disposed between the aforementioned element and another element). In other words, if an element is exactly illustrated as being "directly connected to", "directly disposed on" or "directly linked to" another element, there is without an element disposed between the aforementioned element and another element. Furthermore, the terms of "first", "second" and "third" are only for illustrating different elements or components and not used to limit the elements or components themselves. Thus, the first element/component can be named as the second element/component. Moreover, the combination of the elements/component/structures/modules described in the present specification are not well-known, conventional or common combination in the field, and it is hard for the person skilled in the arts to determine whether the combination relationship is obviousness or not based on the elements/components/structures/modules themselves are conventional or not.

Figure 2:
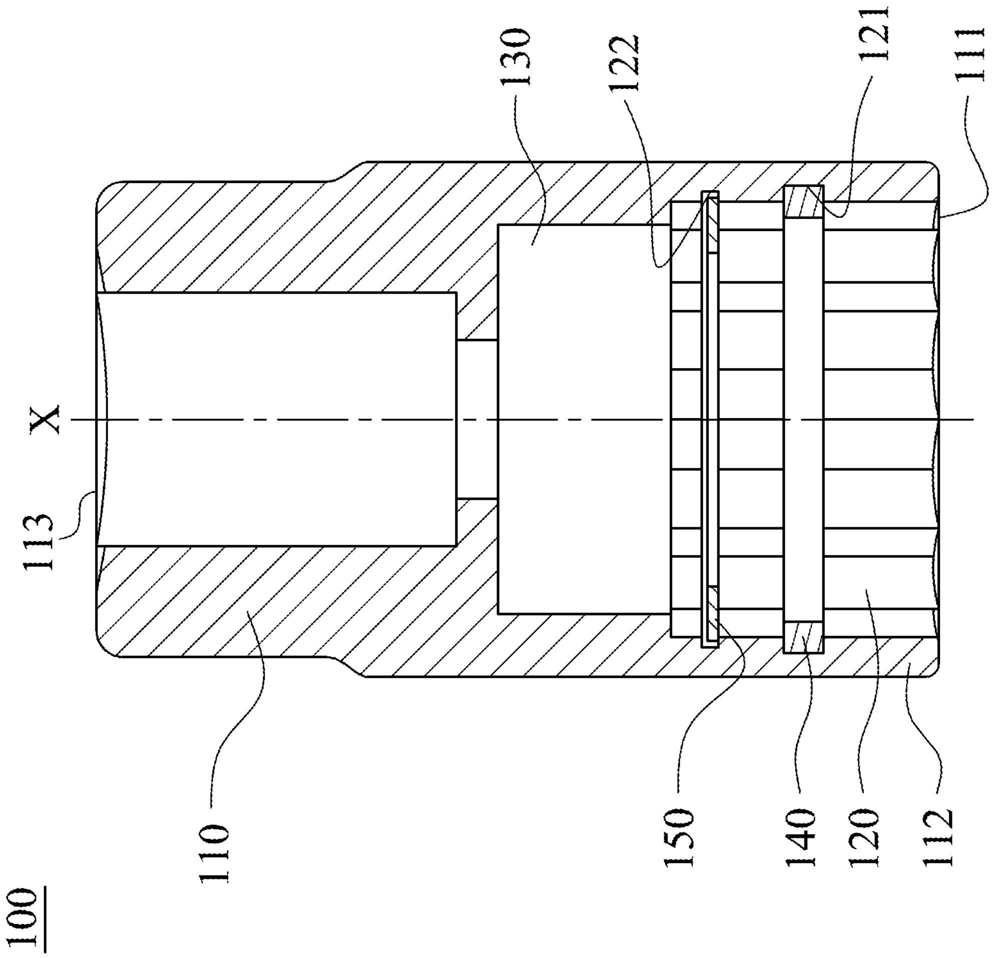
FIG. 2 is a cross-sectional view of the sleeve structure as shown in FIG. 1.
Figure 3:
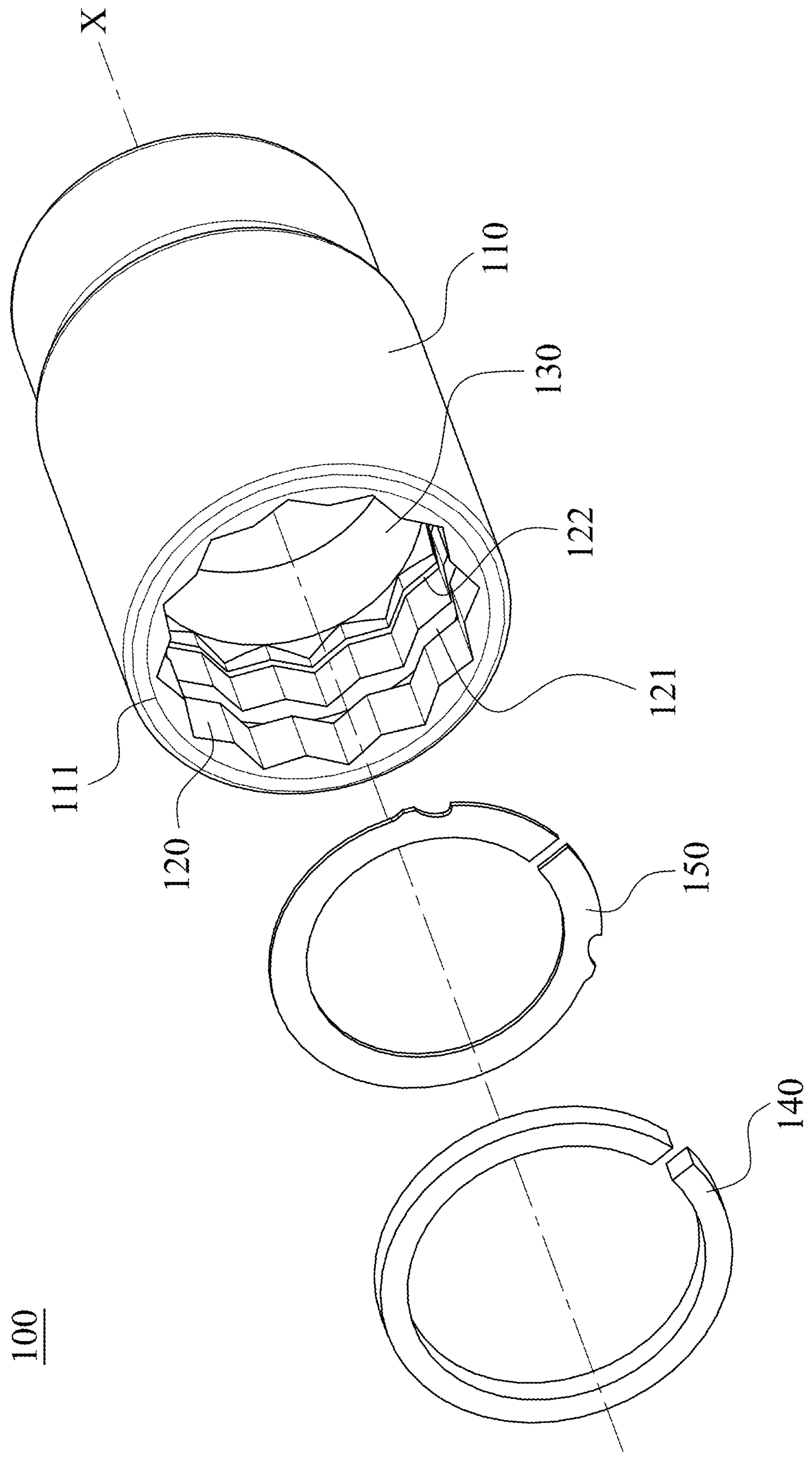
FIG. 3 is an exploded view of the sleeve structure as shown in FIG. 1.

Reference is made to FIG. 1, FIG. 2 and FIG. 3, wherein FIG. 1 is a three-dimensional schematic view of a sleeve structure 100 according to one embodiment of the present disclosure. FIG. 2 is a cross-sectional view of the sleeve structure 100 as shown in FIG. 1. FIG. 3 is an exploded view of the sleeve structure 100 as shown in FIG. 1. As shown in FIG. 1, FIG. 2 and FIG. 3, the sleeve structure 100 includes a sleeve body 110, a tooth structure 120, a stopping structure 130, an elastic component 140 and a resisting component 150.

In particular, the sleeve body 110 has a central axis X, and includes an opening hole 111. The opening hole 111 is opened at one end of the sleeve body 110. The tooth structure 120 is disposed around an inner wall 112 of the sleeve body 110, and includes a first groove 121 and a second groove 122. The first groove 121 and the second groove 122 are disposed around the tooth structure 120, and the first groove 121 is closer to the opening hole 111 than the second groove 122. The stopping structure 130 is disposed around the inner wall 112 of the sleeve body 110, and the stopping structure 130 is farther from the opening hole 111 than the tooth structure 120. The stopping structure 130 includes a through hole 131 and an inner surrounding wall 132, wherein the through hole 131 corresponds to the opening hole 111 and is passed through the inner surrounding wall 132. The elastic component 140 is disposed in the first groove 121 and slightly protruded from the first groove 121. The resisting component 150 is disposed in the second groove 122 and protruded from the second groove 122 toward a direction of the central axis X. Therefore, when a working tool (not shown) is inserted in the sleeve structure 100 from the opening hole 111, the sleeve structure 100 can grip the working tool by the elastic component 140, and block the working tool from entering the inner space of the sleeve structure 100 by the resisting component 150.

In the embodiment of FIG. 2, the sleeve body 110 can further include a driving hole 113, which is opened at the other end of the sleeve body 110. A diameter of the opening hole 111 is larger than a diameter of the driving hole 113. In greater detail, the driving hole 113 can be used for a connecting tool (not shown) to connect with the sleeve structure 100, and the connecting tool can be a sleeve wrench, but not limited thereto.

Furthermore, a distance between the first groove 121 and the stopping structure 130 is smaller than a distance between the first groove 121 and the opening hole 111 of the sleeve body 110. The elastic component 140 is used for gripping the working tool, and the gripping ability of the elastic component 140 can be increased by the distance relationship between the first groove 121 and the stopping structure 130. Moreover, the elastic component 140 can be but not limited to a C-shaped ring, which can increase the uniformity of the elastic component 140 for gripping the working tool, and facilitate the assembly of the elastic component 140.

Figure 4:
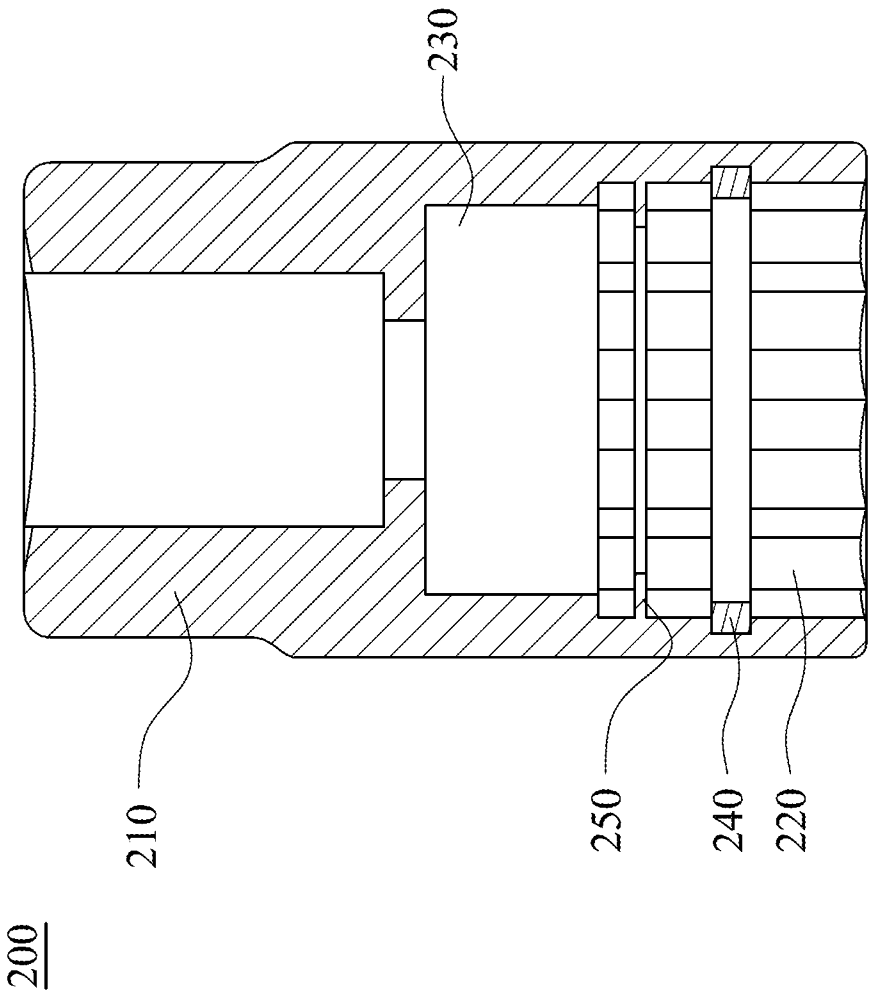
FIG. 4 is a cross-sectional view of a sleeve structure according to another embodiment of the present disclosure.

Reference is made to FIG. 4, which is a cross-sectional view of a sleeve structure 200 according to another embodiment of the present disclosure. The structure and the arrangement position of a sleeve body 210, a tooth structure 220, a stopping structure 230 and an elastic component 240 of the embodiment of FIG. 4 are the same as those of the sleeve body 110, the tooth structure 120, the stopping structure 130 and the elastic component 140 of the embodiment of FIG. 2, and will not be described herein. It is to be noted that a resisting component 250 and the sleeve body 210 of the embodiment of FIG. 4 are formed integrally, which can enhanced the engaging strength of the sleeve structure 200 for engaging the working tool without adding the additional components to increase the manufacturing cost.

Figure 5:
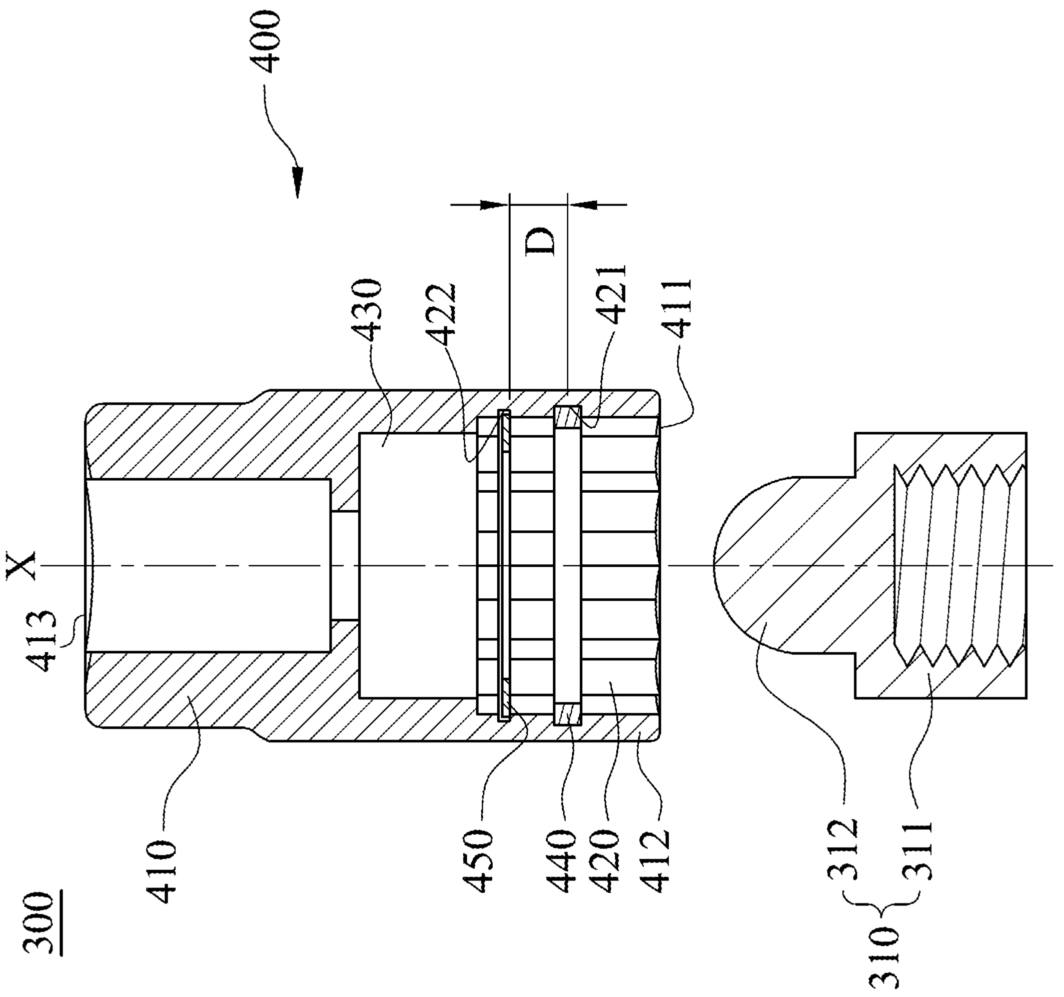
FIG. 5 is a cross-sectional exploded view of a working tool assembly according to further another embodiment of the present disclosure.
Figure 6:
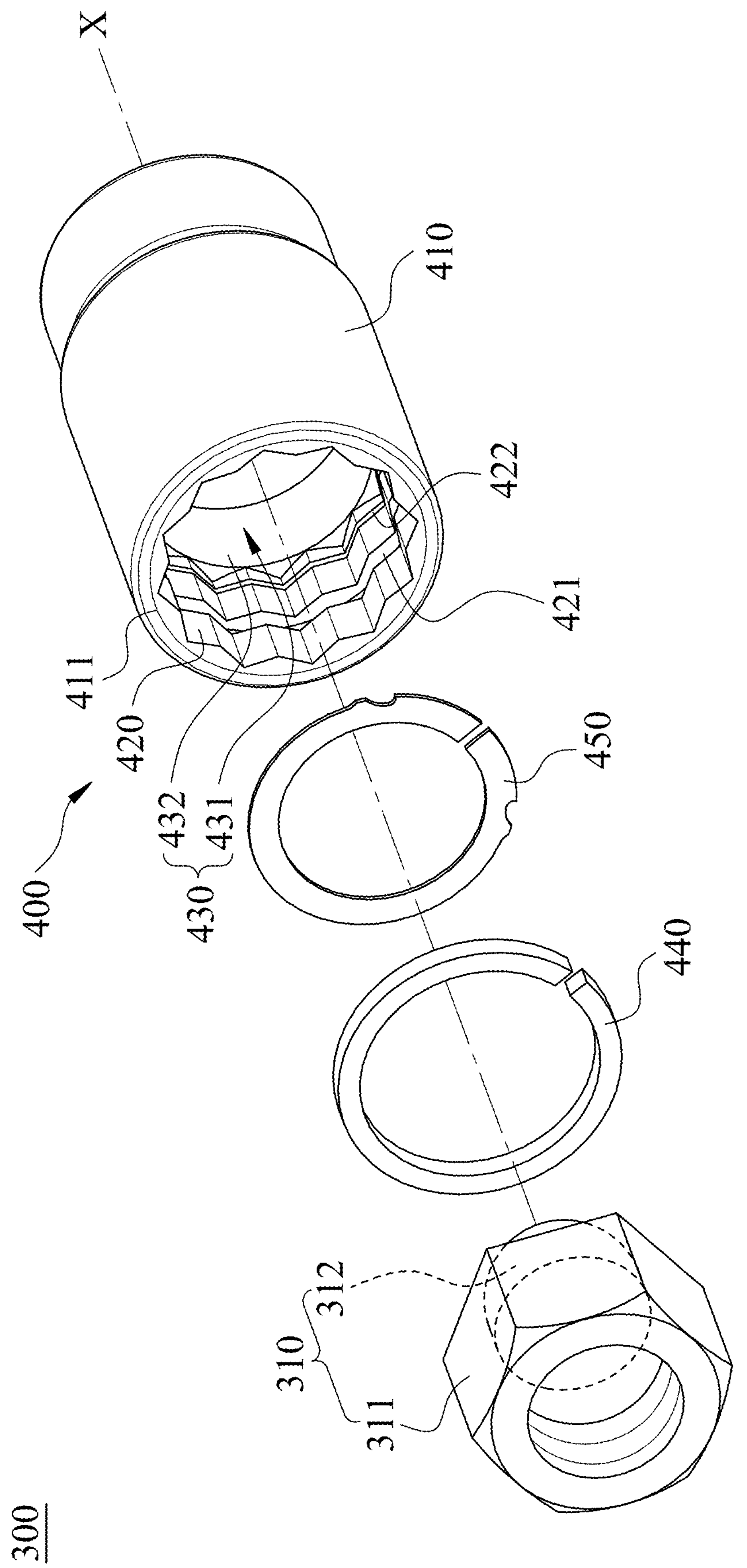
FIG. 6 is an exploded view of the working tool assembly as shown in FIG. 5.

Reference is made to FIG. 5 and FIG. 6, wherein FIG. 5 is a cross-sectional exploded view of a working tool assembly 300 according to further another embodiment of the present disclosure. FIG. 6 is an exploded view of the working tool assembly 300 as shown in FIG. 5. As shown in FIG. 5 and FIG. 6, the working tool assembly 300 includes a sleeve structure 400 and a working tool 310.

In particular, the sleeve structure 400 includes a sleeve body 410, a tooth structure 420, a stopping structure 430, an elastic component 440 and a resisting component 450. The sleeve body 410 has a central axis X, and includes an opening hole 411. The opening hole 411 is opened at one end of the sleeve body 410. The tooth structure 420 is disposed around an inner wall 412 of the sleeve body 410, and includes a first groove 421 and a second groove 422. The first groove 421 and the second groove 422 are disposed around the tooth structure 420, and the first groove 421 is closer to the opening hole 411 than the second groove 422. The stopping structure 430 is disposed around the inner wall 412 of the sleeve body 410, and the stopping structure 430 is farther from the opening hole 411 than the tooth structure 420. The stopping structure 430 includes a through hole 431 and an inner surrounding wall 432, wherein the through hole 431 corresponds to the opening hole 411 and is passed through the inner surrounding wall 432. The elastic component 440 is disposed in the first groove 421 and slightly protruded from the first groove 421. The resisting component 450 is disposed in the second groove 422 and protruded from the second groove 422 toward a direction of the central axis X. The working tool 310 is combined with the sleeve structure 400, and the working tool 310 includes an abutting portion 311. A shape of the abutting portion 311 corresponds to a shape of the tooth structure 420.

In particular, the working tool 310 can be engaged with the tooth structure 420 by the abutting portion 311. The elastic component 440 can grip the abutting portion 311 of the working tool 310, and the abutting portion 311 is abutted against the resisting component 450, so as to prevent the working tool 310 from falling out of the grippable range of the elastic component 440, which is favorable for improving the engaging ability of the sleeve structure 400 to engage the working tool 310. Furthermore, the working tool 310 can further include a receiving portion 312, and a shape of the receiving portion 312 corresponds to a shape of the through hole 431 of the stopping structure 430. Therefore, the receiving portion 312 can be engaged with the through hole 431 by the configuration of the receiving portion 312 to increase the position where the sleeve structure 400 engaged with the working tool 310, which is favorable for improving the engaging strength of the sleeve structure 400 to engage the working tool 310.

In the embodiment of FIG. 5 and FIG. 6, the sleeve body 410 can further include a driving hole 413, which is opened at the other end of the sleeve body 410. A diameter of the opening hole 411 is larger than a diameter of the driving hole 413. Furthermore, the elastic component 440 can be but not limited to a C-shaped ring, which can increase the uniformity of the elastic component 440 for gripping the working tool 310, and facilitate the assembly of the elastic component 440. Moreover, the resisting component 450 and the sleeve body 410 of the embodiment of FIG. 5 also can be formed integrally, as shown in the resisting component 250 of the embodiment of FIG. 4, and will not be described herein.

Figure 8:
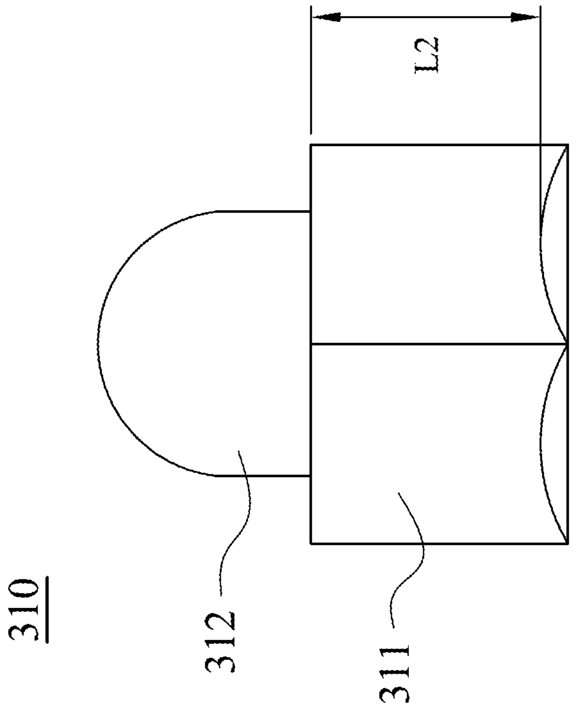
FIG. 8 is a side view of the working tool of the working tool assembly as shown in FIG. 5.
Figure 7:
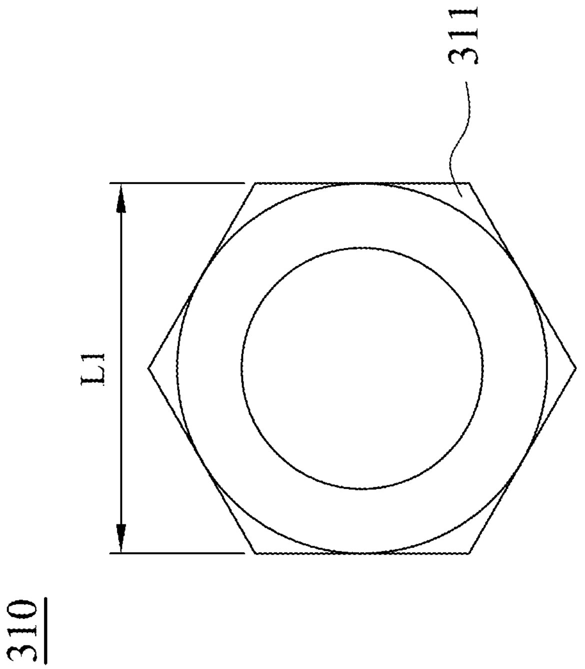
FIG. 7 is a top view of the working tool of the working tool assembly as shown in FIG. 5.

Reference is made to FIG. 7 and FIG. 8, wherein FIG. 7 is a top view of the working tool 310 of the working tool assembly 300 as shown in FIG. 5. FIG. 8 is a side view of the working tool 310 of the working tool assembly 300 as shown in FIG. 5. In the embodiment of FIG. 7 and FIG. 8, the working tool 310 can be a hexagonal nut, but not limited thereto.

In the embodiment of FIG. 5, FIG. 7 and FIG. 8, an abutting width of the abutting portion 311 is L1, an abutting thickness of the abutting portion 311 is L2, and the following condition is satisfied: $0.1 \leq L2/L1 \leq 0.63$. In particular, the abutting thickness L2 is a distance from the highest point of a down edge of the abutting portion 311 to an upper edge of the abutting portion 311, and the abutting thickness L2 and the abutting width L1 are both variables, which can be used to determine a size of the working tool 310. Furthermore, a distance D between the first groove 421 and the second groove 422 depends on the size of the working tool 310. In the embodiment of the present disclosure, the abutting width L1 of the abutting portion 311 of the working tool 310 can be 19 mm, and the abutting thickness L2 of the abutting portion 311 of the working tool 310 can be 2 mm to 12 mm, but not limited thereto. Therefore, due to the relationship between the distance D between the first groove 421 and the second groove 422 and the abutting thickness L2 and the abutting width L1 of the abutting portion 311, when the sleeve structure 400 gripping the working tool 310, the down edge of the abutting portion 311 will not completely sink into the sleeve structure 400, which is favorable for taking off the working tool 310 from the sleeve structure 400 easily, and the gripping effect of the sleeve structure 400 can be increased.

Furthermore, the abovementioned technical features such as the structure and the relative position of the tooth structure, the stopping structure, the elastic component and the resisting component of the present disclosure can be combined and configured according to the requirements of the different sleeve structure, so as to achieve the corresponding effect. In other words, the present disclosure is not limited to the contents disclosed in the abovementioned embodiments.

In conclusion, the sleeve structure and the working tool assembly of the present disclosure has the advantages described bellowing. First, the gripping effect of the sleeve structure can be effectively improved by the configuration of the elastic component. Second, the working tool can be easily taken off from the sleeve structure due to the relationship between the distance between the first groove and the second groove and the abutting thickness and the abutting width of the abutting portion. Third, the working tool can further include the receiving portion to enhance the engaging strength between the sleeve structure and the working tool.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A sleeve structure, comprising:
a sleeve body having a central axis, comprising:
an opening hole opened at one end of the sleeve body;
a tooth structure disposed around an inner wall of the sleeve body, comprising:
a first groove disposed around the tooth structure; and
a second groove disposed around the tooth structure, the second groove having a different size than the first groove, and the first groove closer to the opening hole than the second groove;
a stopping structure disposed around the inner wall of the sleeve body, and the stopping structure farther from the opening hole than the tooth structure, the stopping structure comprising:
a through hole corresponding to the opening hole; and
an inner surrounding wall, wherein the through hole is passed through the inner surrounding wall;
an elastic component disposed in the first groove and slightly protruded from the first groove; and
a resisting component disposed loosely in the second groove by including gaps extending between outer circumferential sides of the resisting component and inner surfaces of the second groove, respectively and by including another gap extending between an upper surface of the resisting component and an upper surface of the second groove, the resisting component protruding from the second groove toward a direction of the central axis, wherein the resisting component has an inner diameter smaller than an inner diameter of the elastic component.

2. The sleeve structure of claim 1, wherein the sleeve body further comprises:
a driving hole opened at the other end of the sleeve body.

3. The sleeve structure of claim 1, wherein the elastic component is a C-shaped ring.

4. A working tool assembly, comprising:
a sleeve structure, comprising:
a sleeve body having a central axis, comprising:
an opening hole opened at one end of the sleeve body;
a tooth structure disposed around an inner wall of the sleeve body, comprising:
a first groove disposed around the tooth structure; and
a second groove disposed around the tooth structure, the second groove having a different size than the first groove, and the first groove closer to the opening hole than the second groove;
a stopping structure disposed around the inner wall of the sleeve body, and the stopping structure farther from the opening hole than the tooth structure, the stopping structure comprising:

a through hole corresponding to the opening hole; and an inner surrounding wall, wherein the through hole is passed through the inner surrounding wall;

an elastic component disposed in the first groove and slightly protruded from the first groove; and a resisting component disposed loosely in the second groove by including gaps extending between outer circumferential sides of the resisting component and inner surfaces of the second groove, respectively and by including another gap extending between an upper surface of the resisting component and an upper surface of the second groove, the resisting component protruding from the second groove toward a direction of the central axis, wherein the resisting component has an inner diameter smaller than an inner diameter of the elastic component; and a working tool combined with the sleeve structure, and the working tool comprising:

an abutting portion, wherein a shape of the abutting portion corresponds to a shape of the tooth structure;

wherein an abutting width of the abutting portion is L1, an abutting thickness of the abutting portion is L2, and the following condition is satisfied: $0.1 \leq L2/L1 \leq 0.63$.

5. The working tool assembly of claim 4, wherein the sleeve body further comprises:

a driving hole opened at the other end of the sleeve body.

6. The working tool assembly of claim 4, wherein the elastic component is a C-shaped ring.

7. The working tool assembly of claim 4, wherein the working tool further comprises:

a receiving portion, wherein a shape of the receiving portion corresponds to a shape of the through hole of the stopping structure.

8. The working tool assembly of claim 4, wherein a distance between the first groove and the second groove depends on a size of the working tool.

* * * * *